March 9, 1926.
J. BECKER
1,576,027
PIPE TURNING APPARATUS
Filed June 6, 1925  2 Sheets-Sheet 1
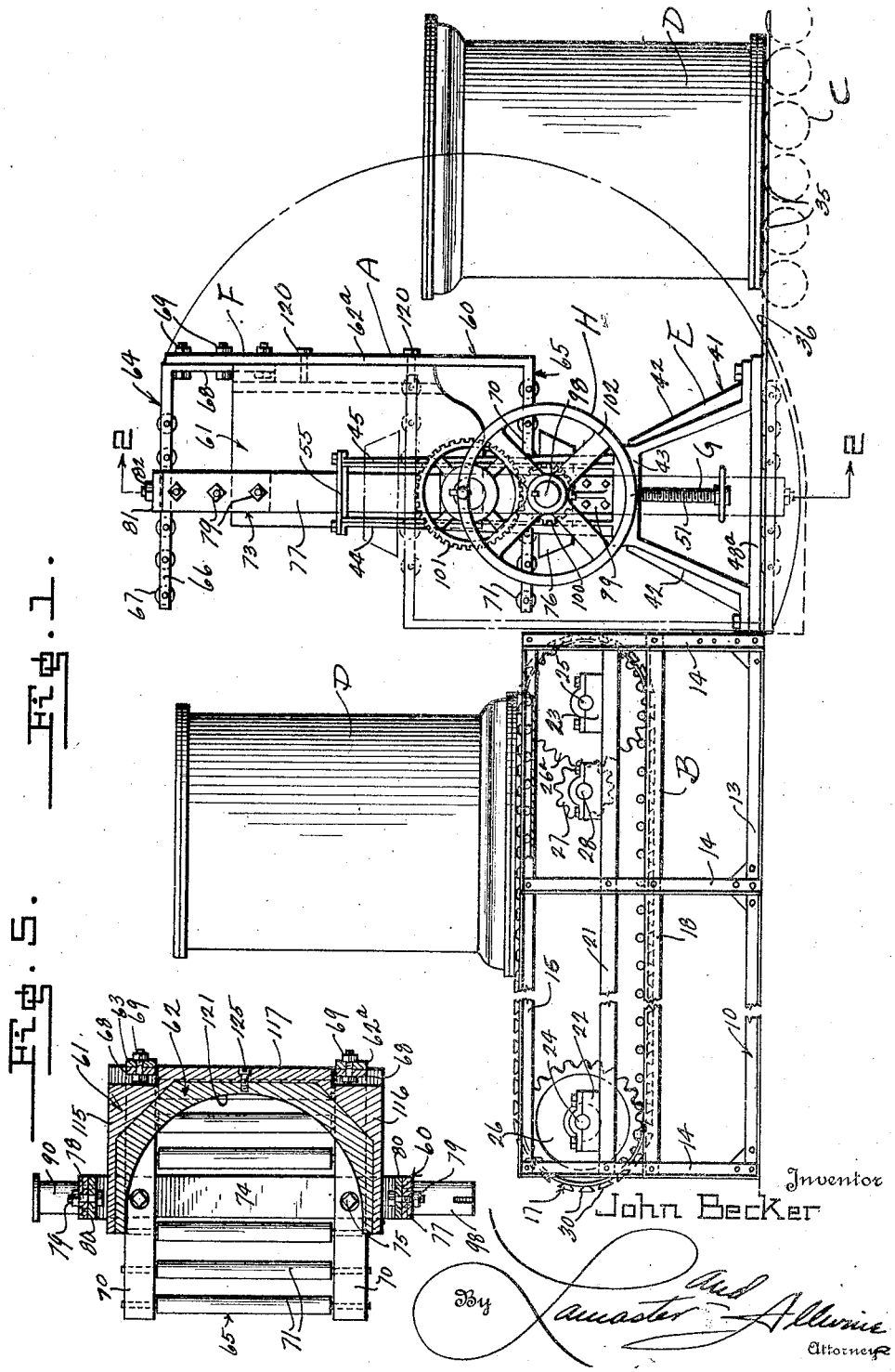
Inventor
John Becker
By Lancaster and Allwine
Attorneys March 9, 1926.
J. BECKER
PIPE TURNING APPARATUS
Filed June 6, 1925
1,576,027
2 Sheets-Sheet 2
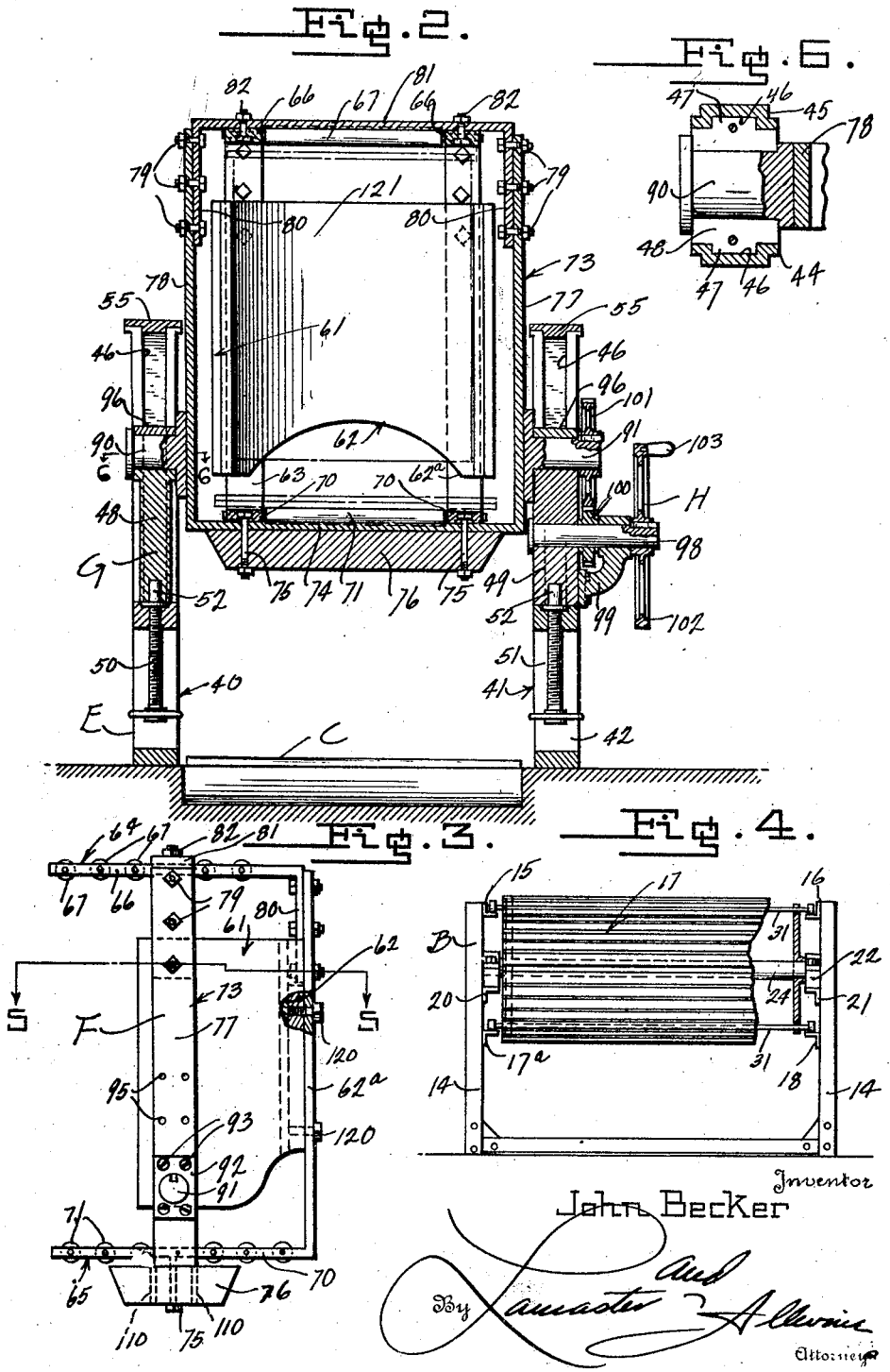
Inventor
John Becker
By Lancaster and A. Levine
Attorneys Patented Mar. 9, 1926.

1,576,027

UNITED STATES PATENT OFFICE.

JOHN BECKER, OF ST. MARYS, PENNSYLVANIA.

PIPE-TURNING APPARATUS.

Application filed June 6, 1925. Serial No. 35,401.

*To all whom it may concern:*

Be it known that I, JOHN BECKER, a citizen of the United States, residing at St. Marys, in the county of Elk and State of Pennsylvania, have invented certain new and useful Improvements in a Pipe-Turning Apparatus, of which the following is a specification.

This invention relates to improvements in pipe turning apparatus.

In the manufacture of sewer pipe or analogous pipe sections, made of clay, shale, or the like, the pipe sections come from the press with the bell end thereof lowermost, and if the section is allowed to thus stand during drying, the weight of the pipe will crack the socket or bell end. It is therefore necessary to reverse the pipe sections to dry, and heretofore it has been the usual practice to manually turn the pipes, or use various types of cradles to facilitate this operation. These usual methods generally take several employees, and the turning structures heretofore developed have not been practical for use in the handling of various sizes of sewer pipe sections. It is therefore an object of this invention to provide a practical type of pipe turner, which may be used for the facile handling of pipe sections, in order to invert the same during the process of making the same, in accordance with such operation as is well known to those skilled in the art to which this invention relates; to handle sewer or like pipes of various sizes; and to provide apparatus which may be easily controlled by a single operator.

A further object of this invention is the provision of novel conveyor means associated with a pipe turning device in order to advance and retract pipe sections therefrom.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved pipe inverting or turning device, showing the same in cooperative relation between conveyors for handling the pipe sections.

Figure 2 is a cross sectional view taken substantially on the line 2—2 of Figure 1, thru the pipe inverting or turning device.

Figure 3 is a side view of certain framework of the cradle of the device.

Figure 4 is a fragmentary end elevation of the conveyor used in connection with the pipe turner.

Figure 5 is a cross sectional view taken substantially on the line 5—5 of Figure 3.

Figure 6 is a sectional view taken on the line 6—6 of Figure 2.

In the drawings, wherein for the purpose of illustration is shown only a preferred embodiment of this invention, the letter A may generally designate the improved pipe turning or inverting device, which may be associated intermediate delivery and retracting conveyors B and C, so that sewer pipe sections D may be delivered by the conveyor B to the pipe turner or inverter A, and swung thru an angle of substantially 180° and delivered upon the conveyor C, which conveys the sections to any desired location.

Referring to the details of the turner A, the same preferably comprises a base E; cradle construction F; means G to support the cradle construction F in adjustable position upon the base E; and means H to swing the cradle construction for the delivery of the pipe sections in inverted relation from the conveyor B to the conveyor C.

Referring to the conveyor B, the same preferably comprises a framework 10, of structural steel angles or the like, and including the base rails 13, vertically upon which the standards 14 are attached, for supporting the guide angles or rails 15 and 16 at the top of the frame 10, at opposite sides thereof, and in parallel relation for slidably supporting the upper moving portion of the conveyor belt 17, as will be subsequently mentioned. Lower track rails 17ª and 18 are carried by the vertical supporting legs 14, at opposite sides of the frame 10, for supporting the lower portion of the endless conveyor belt 17.

The frame 10 furthermore is provided with side beams 20 and 21, upon which bearing blocks 22 and 23 are provided for rotatably supporting shafts 24 and 25 of the conveyor structure. Sprockets 26 and 26ª are keyed upon each of the shaft 24 and 25, and the shaft 25 is preferably provided with a sprocket 26ª with which a gear 27 meshes; the gear 27 preferably being keyed upon a drive shaft 28 which may be supported by the frame 10 in any approved manner.

The endless conveyor 17 may be of any approved type, and the same is preferably provided with slats 30, forming the tread of the belt, and the endless conveyor furthermore preferably is provided with rods 31 at the inner periphery thereof with which the teeth of the sprockets mesh in order to drive the endless conveyor.

The conveyor C is of any approved type, and preferably includes a plurality of conveyor rollers 35 of any approved type, which may be mounted just so the peripheries thereof extend above the top of a floor surface 36. The pipe conveying treads of the conveyors B and C are located in different planes, and it is to be noted that the sections D of the pipe are conveyed on the conveyor B in a plane considerably higher than the plane of the conveyor C, so that the operation of handling the pipe sections may be most expeditiously carried out in connection with the adjustable pipe inverter or turner A.

The pipe turner A preferably includes the base E which is formed of a pair of metal standards 40 and 41, each of which at the lower part thereof are provided with the supporting legs 42, connected as by a piece 43 integral therewith. Each of the standards 40 and 41 includes a pair of vertically disposed guide rails 44 and 45, which for each of the standards 40 and 41 are provided with the facing grooves 46 longitudinally at the facing sides thereof, for receiving the guide ribs or lugs 47 at the opposite side edges of vertically slidable bearing plates or blocks 48 and 49 respectively supported by the standards 40 and 41, as is illustrated in the drawings. The standards 40 and 41, upon the guide rail supporting base pieces 43, respectively support adjusting screws 50 and 51, which are vertically adjustable and at their upper ends being provided with step bearings 52 engaging in suitable sockets made in the lower ends of the bearing plates or blocks 48 or 49, as is illustrated in Figure 2 of the drawings, so that upon adjustment of the screws 50 and 51, the bearing plates or blocks 48 and 49 may be elevated in a desired relation along their standards, for oscillatively supporting the pipe turner A. The upper ends of the guide rails 44 and 45 of each of the standards 40 and 41 are preferably connected by means of a cap 55, which may be bolted thereto in any approved manner.

Referring to the cradle construction the same preferably comprises a frame 60; cradle body 61; and detachable saddle 62.

Referring to the frame 60, it is to be noted that the same is preferably formed of metal bent to a desired shape, to provide a casing having an open side into which the sections D may move from the conveyor B, and from which the pipe sections D may move from the pipe turner onto the conveyor C.

The frame 60 comprises an upper roller-shelf 64; a lower roller-shelf 65; and back wall strips 62ª and 63. The upper roller-shelf 64 really comprises spaced side rails 66, between which rollers 67 extend in rotatable bearing relation at their ends thereon, and the side rails 66 at their connected ends are angled at 68, for detachable connection, as by bolts 69, to the upper ends of the rear straps 62ª and 63, as is illustrated in Figures 1, 2, 3 and 5 of the drawings. The bolts 69 thus adjustably connect the top roller-shelf 64 to the back wall straps 62ª and 63, so that the shelves 64 and 65 may be moved away from or toward each other to accommodate pipe sections D of a desired size.

The lower shelf 65 comprises the side rails 70, which are really integral with the back straps 62ª and 63, and extend at right angles therefrom, and rotatably support rollers 71 therebetween, said rollers bearing at their ends in said rails 70, as is illustrated in Figures 1 and 3 of the drawings.

The frame 10 furthermore includes the body loop 73, which comprises a bottom cross portion 74, connected below the rails 70, as by bolts 75, which are also used for the purpose of adjustably connecting a counterweight 76, in a manner which will be subsequently described. The frame loop 73 furthermore includes side rails 77 and 78, which at their upper ends are apertured for deachably receiving clamping bolts 79, by means of which the connecting leg portions 80 of the top cross rail or piece 81 of the loop 73 may be attached, so that the upper cross portion 81 may be adjusted with respect to the lower cross portion 74, in accordance with that feature of this invention which contemplates that the cradle constructions shall receive pipe sections of different sizes. The cross rail or piece 81 is connected in detachable manner as by bolts 82 with the side rails 66 of the top shelf construction 64, as is illustrated in Figure 2 of the drawings.

From the foregoing description of the frame 60, it can readily be understood that the same in effect provides a reticulate casing. As it is desired to oscillatively connect this reticulate casing to the standard bearing plates 48 and 49, trunnions 90 and 91 are provided at opposite sides of the frame 60, preferably including plate portions 92, having openings therein for receiving attaching bolts or screws 93, by means of which the trunnions 90 and 91 may be connected in an approved adjustment in any of the openings 95 provided thru the side bars or rail portions 77 and 78 of the frame 60, as is illustrated in Figures 2 and 3 of the drawings. The trunnions 90 and 91 are, of course, in horizontal aligning relation, and are connected closer to the bottom shelf 65 of the frame than the opposite shelf 64. The said trunnions 90 and 91 bear in the upper ends of the bearing plates 48 and 49, and are detachably connected therein as by bearing caps 96.

As to the means H for swinging the cradle construction A upon the frame E, a shaft 98 is rotatably supported on the bearing block 49, transversely extending therethru, and at its outer end being further supported by means of a bracket 99 attached at the outer side of the bearing block 49. This shaft 98 between the bracket 99 and the bearing block 41 is preferably provided with a pinion 100 meshing with a gear wheel 101 which is keyed upon the outer end of the trunnion 91. A hand wheel 102 is preferably keyed at the outer end of the shaft 98, and may be provided with a handle 103, if desired.

From the foregoing description it can be seen that upon operation of the hand wheel 102, the gears 100 and 101 incident to their intermeshing relation will swing the cradle construction A thru a desired angle. The counterweight or balance 86 is connected upon the cradle A, so that it will normally return the cradle construction with its open side facing the conveyor B, for receiving a section of the pipe D therefrom, in the relation illustrated in Figure 1 of the drawings. However, upon operation of the cradle construction by means of the hand operating means H, the cradle construction A may be swung thru 180°, to position the pipe section D in an inverted relation, so that it can be moved from the shelf 64 upon which it then rests, onto the conveyor C, in the relation illustrated in Figure 1 of the drawings.

The counterbalance 76, as is illustrated in dotted lines in Figure 3 of the drawings, is provided with several series of transverse openings 110, for receiving the bolts 75, by means of which the counterbalance may be so weighted upon the bottom shelf of the cradle E, that the same will properly counterbalance the cradle construction, according to the type of pipe which it is to handle. The main function of the counterbalance is of course to return the cradle construction to pipe receiving position illustrated in Figure 1.

The cradle body 61 includes the side walls 115 and 116, and the rear wall 117, the latter being bolted as at 120, so that the cradle body 61 is open at the open side of the frame 60, and is likewise open at the ends thereof.

The saddle 62 is for the reception in the cradle body 61, and it may be concavo-convex in cross section, and the same provides the concave pocket 120 which receives the body of the pipe section D. This saddle 62 is removable, being held in position in the cradle body 61 by means of screws or bolts 125, so that various sized saddles may be used with pockets of desired size to suit the size of the pipe sections being handled.

In operation, the pipe inverter is used as above mentioned, and it is to be noted that it inverts the pipe by taking it from the upper plane of the conveyor B and swinging it thru 180° into inverted relation upon the lower plane of the conveyor C. The pipe turner is adjustable for receiving pipes of various lengths, and the saddle 62 is removable to receive pipe sections of desired diameter.

Various changes in the shape, size, and arrangement of parts may be made to the form of invention herein shown and described, without departing from the spirit of the invention or the scope of the claims.

I claim:

1. In a pipe turning device a supporting frame, a cradle including pipe supporting shelves and connecting means therebetween, said cradle being open at a side thereof between said shelves, means eccentrically and oscillatively supporting the cradle on the frame on a pivot axis closer to one of the shelves than the other shelf, and counter weight means connected with the cradle adjacent that shelf closest to the pivot axis of the cradle, for returning the cradle to a predetermined position.

2. In a pipe inverter the combination of a supporting frame, a pipe receiving cradle construction oscillatively carried by the frame including a body and a bearing trunnion, means for adjusting the axis of movement of the cradle along said frame, and means for adjusting the trunnion of the cradle along the body.

3. In a pipe inverter the combination of a supporting frame, a pipe receiving cradle construction oscillatively carried by the frame including a body and bearing trunnions, means for adjusting the axis of movement of the cradle along said frame, means for adjusting the trunnions of the cradle along the body, and means for varying the size of the cradle body for receiving pipe sections of various sizes.

4. In a pipe turner a pair of supporting standards, bearing blocks vertically slidable on said supporting standards, screws adjustably carried by the supporting standards for adjusting the positions of said bearing blocks, a pipe inverting cradle having trunnions oscillatively bearing on said bearing blocks, and means for adjusting the size of said cradle and the position of the trunnions along the cradle.

5. In a pipe turner a pair of supporting standards, bearing blocks vertically slidable on said supporting standards, screws adjustably carried by the supporting standards for adjusting the positions of said bearing blocks, a pipe inverting cradle having trunnions oscillatively bearing on said bearing blocks, and counterweight means carried by the cradle for returning it to a predetermined position with respect to said bearing blocks.

6. In a pipe turner of the class described a pair of standards, a cradle including trunnions bearing on said standards so that the cradle may be swung thru substantially 180°, means for bodily adjusting the cradle along said standards, an operating shaft bearing on one of said standards, and gear means connected between said operating shaft and one of said trunnions for swinging the cradle upon movement of said operating shaft.

7. In a pipe turner of the class described a pair of standards, a cradle including trunnions bearing on said standards so that the cradle may be swung thru substantially 180°, an operating shaft bearing on one of said standards, gear means connected between said operating shaft and one of said trunnions for swinging the cradle upon movement of said operating shaft, and counterweight means carried below the cradle for returning it to a pipe receiving position.

8. In a pipe inverter the combination of a supporting frame, a cradle construction movably carried by the supporting frame including relatively adjustable top and bottom roller-shelves, and counterweight means adjustably connected to said bottom shelf for normally maintaining the same lowermost.

9. In a pipe inverting apparatus the combination of an elevated pipe depositing table, a pipe receiving table located on a plane lower than the pipe depositing table, and a pipe inverter disposed between the pipe depositing and pipe receiving tables, including a supporting frame, a swinging cradle, and means pivoting the swinging cradle upon the supporting frame upon an adjustable pivot axis between the ends of said cradle.

10. In pipe inverting apparatus the combination with an elevated pipe depositing table, a pipe receiving table lower than the depositing table, a supporting frame between said tables, a cradle including an open side and end pipe supporting shelves, and means pivotally mounting the cradle on a pivot axis between said shelves and closer to one shelf than the other shelf.

11. In pipe inverting apparatus the combination with an elevated pipe depositing table, a pipe receiving table lower than the depositing table, a supporting frame between said tables, a cradle including an open side and end supporting shelves, means pivotally mounting the cradle on a pivot axis between said shelves and closer to one shelf than the other shelf, and a counterweight carried by that shelf which is closer to the cradle pivot axis for returning the open side of the cradle into alignment with the pipe depositing table for receiving a pipe.

12. In pipe inverting apparatus the combination with spaced upper and lower pipe depositing and receiving tables, a supporting frame between said tables, a pipe receiving cradle oscillatively carried by the frame including a body and bearing trunnions, means for adjusting the axis of movement of the cradle along said frame in a line transversely of the planes of the upper and lower tables, and means for adjusting the trunnion axis of the cradle along the body.

13. In pipe inverting apparatus the combination of an upper pipe depositing table, a lower pipe receiving table, a supporting frame between said tables, a cradle adjustable as to size to receive pipes of various heights and diameters, trunnion means for the cradle adjustable longitudinally of the cradle, and adjustable bearing means on the frame for pivotally supporting said trunnions.

14. In pipe inverting apparatus the combination of an upper pipe depositing table, a lower pipe receiving table, a supporting frame between said tables, a cradle adjustable as to size to receive pipes of various heights and diameters, trunnion means for the cradle adjustable longtiudinally of the cradle, adjustable bearing means on the frame for pivotally supporting said trunnions, the trunnion axis of the cradle being located closer to one end of the cradle than the other, and counterweight means carried by that other end of the cradle which is closer to the trunnion axis for normally returning the cradle to a pipe receiving position with the upper pipe depositing table.

JOHN BECKER.